United States Patent [19]

Akao

[11] Patent Number: 4,876,129
[45] Date of Patent: * Oct. 24, 1989

[54] PACKAGING MATERIAL FOR PHOTOGRAPHIC PHOTOSENSITIVE MATERIALS

[75] Inventor: Mutsuo Akao, Kanagawa, Japan

[73] Assignee: Fuji Photo Film Co., Ltd., Kanagawa, Japan

[*] Notice: The portion of the term of this patent subsequent to Oct. 20, 2004 has been disclaimed.

[21] Appl. No.: 64,654

[22] Filed: Jun. 22, 1987

[30] Foreign Application Priority Data

Jun. 23, 1986 [JP] Japan ................................. 61-144758
Jun. 23, 1986 [JP] Japan ................................. 61-144759

[51] Int. Cl.$^4$ ............................................. B29D 22/00
[52] U.S. Cl. .................................... 428/359; 428/35.3; 428/349; 428/408; 428/516; 428/913
[58] Field of Search ................. 428/35, 349, 913, 408, 428/516; 264/176.1

[56] References Cited

U.S. PATENT DOCUMENTS

| | | | |
|---|---|---|---|
| 4,147,291 | 4/1979 | Akao et al. | 229/55 |
| 4,258,848 | 3/1981 | Akao et al. | 206/524.2 |
| 4,331,725 | 5/1982 | Akao | 428/138 |
| 4,337,285 | 6/1982 | Akao et al. | 428/349 |
| 4,356,224 | 10/1982 | Akao et al. | 428/220 |
| 4,359,499 | 11/1982 | Akao et al. | 428/483 |
| 4,386,124 | 5/1983 | Akao | 428/35 |
| 4,411,943 | 10/1983 | Akao | 428/161 |
| 4,411,945 | 10/1983 | Akao et al. | 428/216 |
| 4,436,809 | 3/1984 | Akao et al. | 428/501 |
| 4,452,846 | 6/1984 | Akao | 428/222 |
| 4,469,741 | 9/1984 | Akao | 428/214 |
| 4,505,970 | 3/1985 | Craver | . |
| 4,513,050 | 4/1985 | Akao | 428/200 |
| 4,565,733 | 1/1986 | Akao | 428/214 |
| 4,565,743 | 1/1986 | Akao | 428/522 |
| 4,576,865 | 3/1986 | Akao | 428/335 |
| 4,579,781 | 1/1986 | Akao | 428/461 |
| 4,584,234 | 4/1986 | Hirose et al. | 428/323 |
| 4,587,175 | 5/1986 | Akao | 428/596 |
| 4,590,124 | 5/1986 | Schoenberg | . |
| 4,629,640 | 12/1986 | Akao | 428/35 |
| 4,639,386 | 1/1987 | Akao | 428/35 |
| 4,653,640 | 3/1987 | Akao | 428/213 |
| 4,661,395 | 4/1987 | Akao | 428/213 |
| 4,661,401 | 4/1987 | Akao | 428/215 |
| 4,663,218 | 5/1987 | Akao | 428/212 |
| 4,687,692 | 8/1987 | Akao | 428/137 |
| 4,701,359 | 10/1987 | Akao | 428/35 |

Primary Examiner—Edith Buffalow
Attorney, Agent, or Firm—Burns, Doane, Swecker & Mathis

[57] ABSTRACT

A packaging material for photographic photosensitive materials which comprises a simultaneously coextruded multiple layer light-shielding film comprising the inner layer being a heat-sealing layer containing 30 to 99.49 wt. % of linear low density polyethylene resin, 0.5 to 10 wt. % of carbon black and 0.01 to 1 wt. % of a lubricant, having 0.12 to 0.37 of a statical friction coefficient and the outer layer formed of a thermoplastic resin having 0.19 or more of a statical friction coefficient which is greater than the above inner layer by 0.05 or more, and having 10 g/15 mm width or more of the binding strength between each layer of the coextruded multiple layer film. This coextruded multiple layer film may contain an intermediate layer formed of a thermoplastic resin.

In the packaging material of the invention, the inner layer is excellent in light-shielding, insertion of products, antiblocking, antistatic property for frictional electrification, moisture proofness and gas barrier. It is also excellent in heat sealing properties such as heat seal strength, hot tack properties and seal ability of contraries, elapsed seal strength and physical strengths. Accordingly, physical strengths of the outer layer may not be so high, and as a result, more than 10 wt. % of an antistatic light-shielding material such as carbon black can be blended into the outer layer to improve antistatic property including frictional electrification and light-shielding. When an intermediate layer is incorporated, this layer not only prevents delamination but also raises physical strengths of coextruded film by controlling binding strengths to the inner layer and to the outer layer. More than 10 wt. % of an antistatic light-shielding material such as carbon black or metal powder, etc. can be blended into the intermediate layer to improve antistatic property including frictional electrification and light-shielding.

6 Claims, 2 Drawing Sheets

PACKAGING MATERIAL FOR PHOTOGRAPHIC PHOTOSENSITIVE MATERIALS

BACKGROUND OF THE INVENTION

1. Field of the Invention

This invention relates to a packaging material for photographic photosensitive materials.

2. Description of Prior Art

Various types of packaging material for photographic photosensitive materials have widely been put to practical use, and various properties are required according to their uses.

As the packaging materials for photographic photosensitive materials, it is necessary to have various properties such as light-shielding, slitability, gas barrier, moistureproofness, antistatic property, rigidity, physical strengths such as breaking strength, tear strength, impact puncture strength, Gelbo test strength and wear resistance, heat sealing properties such as heat seal strength, cut sealability, hot tack properties (hot-seal ability) and seal ability with contrasting material, flatness, elapsed heat seal strength, slipping character and the like. The slitability is the property capable of cutting film smoothly without jagged edges or rupture. This cut sealability is the suitability for forming a fuging seal. In this sealing method, the hot plate for press is a knife-shaped, and melting adhesion and cutting simultaneously occur.

Generally, it is difficult to satisfy these properties by a single material. Therefore, a single layer film of a high-pressure low-density polyethylene (LDPE) kneaded with carbon black or a pigment, and a composite laminated film composed of a LDPE film and a flexible sheet such as paper, aluminum foil or cellophane, etc. have been employed. An example of the conventional film is shown in FIG. 8. This film is a thick single layer film of a light-shielding LDPE resin layer 8a containing carbon black. Another example of the conventional film is shown in FIG. 9. This film was used for packaging a roll of color photographic printing paper, and it is composed of a light-shielding LDPE resin layer 8a, an aluminum foil layer 9, a flexible sheet layer 6, and a light-shielding LDPE resin layer 8a. They are laminated in that order, and an adhesive layer 5 is provided between each layer.

On the other hand, the present inventor has already disclosed a laminated film for photographic photosensitive materials of which physical strength was raised by combing two uniaxially oriented films (U.S. Pat. No. 4,331,725). The inventor has also disclosed a laminated film composed of a foamed sheet having a thickness of 0.3 to 2 mm and an expansion ratio of 5 to 50 times and two uniaxially oriented films laminated on both sides of the foamed sheet so that their molecular orientation axes at larger than 30 degrees (U.S. Pat. No. 4,565,733).

Physical properties of the conventional laminated films are not enough, and during packaging, the films were sometimes torn or hoels made or heat sealing of the films sometimes separated. In addition, when a large amount of a light-shielding material, such as carbon black, was added, physical strengths and heat sealing properties of the film became insufficient. Then, the amount of carbon black was set about 3%, and thickness of the film was more than 70 μm. As a result, the film was stiff, and working efficiency of the packaging process decreased. The cost the packaging was also expensive.

For example, in the case of the laminated film having a 7 layer constitution used as the package for a roll of color photographic printing paper, since the aluminum foil was incorporated in order to secure moistureproofness and antistatic property, physical strengths such as tear strength, impact puncture strength and Gelbo test strength were insufficient. The laminated film disclosed in U.S. Pat. No. 4,565,733 was improved in the physical strengthes such as tear strength, impact puncture strength and Gelbo test strength. However, this laminated film was thick, and antistatic property was insufficient as the packaging material for highly sensitive photographic photosensitive materials. Heat sealing properties were also insufficient in order to secure light-shielding and moistureproofness. Moreover, the ability of being capable of being used in automatic bag making was lacking. Therefore, the heat sealing position was put between heat resistant films, and sealed by using a heat sealer having a particular cooling device.

SUMMARY OF THE INVENTION

It is an object of the invention to provide a packaging material for photographic photosensitive materials which has solved the above problems.

It is another object of the invention to provide a packaging material for photographic photosensitive materials which is superior in insertion of the product to be packaged, elapsed heat seal strength, physical strengths, heat sealing properties, antistatic property and the like.

The present invention has achieved such objects and provides a packaging material for photographic photosensitive materials which comprises a simultaneously coextruded multiple layer light-shielding film comprising an inner layer which is a heat-sealing layer containing 30 to 99.49 wt. % of linear low density polyethylene resin, 0.5 to 10 wt. % of carbon black and 0.01 to 1 wt. % of a lubricant, and having a static friction coefficient of 0.12 to 0.37 and an outer layer formed of a thermoplastic resin having a static friction coefficient of 0.19 or more and which is greater than said inner layer by 0.05 or more, and having a binding strength of 10 g/15 mm width or more between each layers of said coextruded multiple layer film.

DETAILED DESCRIPTION OF THE INVENTION

Figure 1:
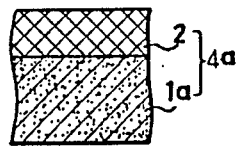
FIGS. 1 to 6 are partially sectional views of preferred embodiments of the invention.

L-LDPE is a copolymer of ethylene and α-olefin, and has a linear structure having short branches. The carbon number of the α-olefin is 3–13, preferably 4–10, and examples are butene-1, 4-methylpentene-1, hexene-1, heptene-1 and octene-1. Preferably α-olefins are 4-methylpentene-1, hexene-1 and octene-1. Suitable ethylene content of L-LDPE is 85–99.5 mol. %, i.e. α-olefin content is 0.5–15 mol. %, and the preferable ethylene content is 90–99.5 mol. %, i.e. α-olefin content is 0.5–10 mol. %. Suitable density is in the range of 0.87–0.945 g/cm$^3$, preferably 0.930–0.945 g/cm$^3$ (ASTM D-1505).

Melt index (M.I., at 190° C.) is preferably 0.4–30 g/10 minutes (ASTM D-1238). Such a L-LDPE resin is manufactured by vapor phase or liquid phase low- or medium-pressure method or modified high-pressure method. Examples of L-LDPE resin are "UNIPOLE" and "TUFLIN" (trade names, UCC), "DOWLEX" (trade name, Dow Chemical Co., Ltd.), "STAMILEX" (trade name, DSM), "SUCLEAR" (trade name, DuPont de Nemour, Canada), "MARLEX" (trade name, Phillips Co., Ltd.), "ULTZEX" and "NEOZEX" (trade names, Mitsui Petroleum Chemical Industries Co., Ltd.), "NISSEKI LINIREX" (trade name, Nippon Petrochemicals, Co., Ltd.), "IDEMITSU POLYETHYLENE-L" (Idemitsu Petrochemical Co., Ltd.) and "NUC POLYETHYLENE-LL" (trade names, Nippon Unicar Co., Ltd.).

The L-LDPE resin may be used alone or mixed with thermoplastic resin(s). However, even in the latter case, the content of L-LDPE is more than 30 wt. % in order to secure its superior properties such as physical strengths including tear strength and impact puncture strength and heat sealing properties such as heat seal strength, hot tack properties and seal ability with contrasting material. As the thermoplastic resin mixed with L-LDPE resin, a polyolefin resin, particularly LDPE resin, ethylene-vinyl acetate copolymer (EVA) resin and ethylene-ethyl acrylate copolymer (EEA) resin are preferable in view of the improvement of inflation film moldability and only slight decrease in physical strength.

The carbon black essential to the inner layer is blended in order to improve elapsed heat seal strength and antistatic property in addition to light-shielding, and its content is 0.5 to 10 wt. %. This content is rescricted by considerations such as physical strength, film moldability, moistureproofness, antistatic property, film quality and the like. When the content is less than 0.5 wt. %, light-shielding, elapsed heat seal strength and antistatic property become insufficient. While, when the content is beyond 10 wt. %, hygroscopicity becomes a problem, and film moldability decreases. Physical strengths, heat seal properties and moistureproofness are also problems. Besides, black powder generated by rubbing with the photographic photosensitive materials packaged adheres on the surfaces of photographic photosensitive materials to cause troubles in exposure and development.

The necessary antistatic property which makes surface resistance less than $10^{10}\Omega$ may be endowed by carbon black alone. In this case, it is necessary to use conductive carbon black. Examples of conductive carbon black are acetylene carbon black and Ketschen carbon black which is a modified by-product carbon black.

The antistatic property may be secured by blending a conductive material in addition to carbon black. Examples of conductive materials are various conductive metal particles, antistatic agents (for example, enumerated in "Taiden Boshi Zai" (Hideo Marumo, published by Saiwai Shobo, Japan)), and the metal powder, the fibrous conductive filler or other fillers hardened by using a liquid polymer or an organic solvent-soluble polymer. In this case, the carbon black having a pH of 5 to 9 and a mean particle size of 10 to 120 m$\mu$ is preferable. Particularly, oil furnace carbon black having a pH of 6 to 8 and a mean particle size of 15 to 30 m$\mu$ is preferable because of dispersibility and light-shielding ability. By using the carbon black of such a pH and particle size, a packaging material suitable for photographic photosensitive materials and having the following merits is obtained. That is, the occurrence of fogging is rare, an increase or decrease of photosensitivity rarely occurs, light-shielding ability is large, and the lumps of carbon black and pinholes such as fish eye are hardly generated.

As the method of blending carbon black with the L-LDPE resin, powder blending method, paste blending method, wet blending method, compound coloring method, masterbatch method, etc. may be employed. Among them, the masterbatch method is preferable in terms of cost and ease of processing. Various masterbatch methods are known, and any known method may be employed. Such a masterbatch method includes the method of dispersing carbon black into a polymer organic solvent solution to produce a masterbatch (Japanese Patent KOKOKU No. 40-26196) and the method of dispersing carbon black into polyethylene to produce a masterbatch (Japanese Patent KOKOKU No. 43-10362).

In this method, first, a masterbatch is prepared by blending more than 10 wt. %, usually more than 30 wt. %, of carbon black with a polyolefin, preferably LDPE, L-LDPE, EVA, EEA, ethylene-methacrylate copolymer (EMA) or the like. The, L-LDPE resin or the thermoplastic resin to be blended with the L-LDPE resin is blended with this masterbatch so that the carbon black content becomes 0.5 to 10 wt. %.

The lubricant is blended in order to improve insertion of the product to be packaged, antiblocking ability, film moldability, antistatic electrification ability at releasing and the like. A suitable content of the lubricant is 0.01 to 1 wt. % which is determined by considering the above properties and any adverse effects caused by excess lubricant. When the content is beyond the suitable range, the surface of the packaging material becomes sticky and dusts adhere to it. The excess lubricant adversely affects the photographic photosensitive material, and development troubles can occur. In terms of the influence on photosensitive materials and improvement of the foregoing properties including slipping character, silicone lubricants, fatty acid amide lubricants, fatty acid lubricants and alkylamine lubricants are preferable. The silicone lubricants include dimethylpolysiloxane. The fatty acid amide lubricants have a carbon number of 10 to 50, preferably 15 to 35, and include an alkylene bis fatty acid amide. Examples of such a fatty acid amide are oleic acid amide, erucic acid amide and stearic acid amide. The carbon number of the fatty acids is in the range as the above case of the fatty acid amides.

Examples of commercial lubricants suitable for the present invention include:

Silicone lubricants; "SHINETSU SILICONE" (Shinetsu Chemical Co., Ltd.), "TORAY SILICONE" (Toray Silicone Co., Ltd.)

Oleic acid amide lubricants; "ARMOSLIP-CP" (Lion Akzo Co., Ltd.), "NEWTRON" and "NEWTRON E 18" (Nippon Fine Chemical Co., Ltd.), "AMIDE-O" (Nitto Kagaku K.K.), "DIAMID G-200" (Nippon Kasei Chemical Co., Ltd.)

Erucic acid amide lubricants; "ALFLOW P-10" (Nippon Oil and Fats Co., Ltd.)

Stearic acid amide lubricants; "ALFLOW S-10" (Nippon Oil and Fats Co., Ltd.), "NEWTRON 2" (Nippon Fine Chemical Co., Ltd.) "DIAMID 200" (Nippon Kasei Chemical Co., Ltd.)

Bis fatty acid amide lubricants; "BISAMIDE" (Nitto Kagaku K.K.), "DIAMID-200 BIS" (Nippon Kasei Chemical Co., Ltd.), "ARMOWAX-EBS" (lion Akzo Co., Ltd.)

Alkylamine lubricants; "ELECTROSTRIPPER TS-2" (Kao Corp.)

The static friction coefficient of the inner layer is 0.12 to 0.37. This static friction coefficient is determined as follows. A part of the film to be tested is cut off, and stuck on the underside of a block of 75 mm length×35 mm width and weighing 200 g. Another part of the same film is stuck on an inclined face, and the above block is placed on the face. The inclined angle is increased, and the angle ($\theta$) where the block began to slip is read. The coefficient is represented by the tangent of the angle.

When the statical friction coefficient becomes less than 0.12, the photographic photosensitive materials move around in the package, and scratches or abrasion marks are formed by the movement. Curling troubles such as unrolling and slippage to form a cone also occur. On the other hand, when the static friction coefficient is beyond 0.37, insertion of photographic photosensitive materials becomes difficult. As a result, the packaging film is ruptured, or scratches or abasion marks are formed on the surface of photographic photosensitive materials. Blocking also occurs not only between the inner layers of the bag formed by the packaging material of the invention but also between the inner layer and photographic photosensitive materials. Additionally, black powder generated by rubbing with photographic photosensitive materials adheres to the surface of the photographic photosensitive materials to cause exposure and development troubles.

The outer layer is formed of a thermoplastic resin. This thermoplastic resin is preferably a polyolefin resin, such as LDPE resin, medium-density polyethylene (MDPE) resin, HDPE resin, L-LDPE resin, ethylene-propylene copolymer resin (random type or block type), ethylene-(butene-1) copolymer resin, propylene-(butene-1) copolymer resin, poly (butene-1) resin, polystyrene resin, poly(methyl methacrylate) (resin, styrene-acrylonitrile copolymer resin, ABS resin, PP resin, crystalline propylene-α-olefin copolymer resin, modified polypropylene resin, modified polyethylene resin, polypropylene-maleic anhydride graft copolymer resin, chlorinated polyolefin resin such as chlorinated polyethylene resin, chlorinated HDPE resin, chlorinated LDPE resin, chlorinated polyethylene copolymer resin and chlorinated atactic PP resin, EVA resin, ethylene ionomer resin (copolymer of ethylene and unsaturated acid crosslinked by metal ions), poly(4-methylpentene-1) resin, ethylene-acrylic acid copolymer (EAA) resin, EMA resin, vinyl chloride-propylene resin, ethylene-vinyl alcohol copolymer resin, crosslinked polyethylene resin (electron rays irradiation crosslinking, chemical crosslinking, etc.), polyisobutylene resin, ethylene-vinyl chloride copolymer resin and poly(1,2-butadiene)resin.

Since the inner layer is excellent in physical strengths, wear resistance, heat sealing properties and moistureproofness, these properties are not so strictly required for the outer layer. Accordingly, a conductive material may be added to the outer layer, though the conductive material generally lowers the above properties. The conductive material includes antistatic agent, metal powder, conductive carbon black such as acetylene carbon black and Ketschen carbon black, conductive zinc or tin oxide, graphite powder, metal fiber, carbon fiber including graphite fiber and graphite or other carbon short fiber like whisker, potassium titanate fiber, metal-coated filler and polyalkylene oxide compounds. Two or more conductive materials may be combined. The above conductive materials may be added to the inner layer, but its content is restricted. In the case that the conductive material is blended, the base resin of the outer layer may be selected according to the resin composition of the layer to be blended, however, various polyolefin resins particularly various polyethylene resins, propylene-α-olefin copolymer resin, EEA resin, EMA resin, EAA resin, EVA resin, ionomer resin and adhesive polymer are preferable. A commercial conductive resin such as "PAPIOSTAT" (TOKYO PRINTING INK MFG. CO.), "LIOCONDUCT" (TOYO INK MFG. CO., LTD.) and "DAIELEC" (DAINIPPON INK AND CHEMICALS, INC.) may be used alone or blended with other thermoplastic resin(s) to use.

Various thermoplastic resins and additives may be blended in the outer layer. However, the amounts to be blended are restricted because of securing the necessary statical friction coefficient of this layer.

In the case that the bag for packaging photographic photosensitive materials is made of the packaging material of the invention alone, the melting point of the outer layer is preferably higher than the inner layer by more than 5° C., particularly more than 10° C. The thermoplastic resin suitable for such an outer layer includes HDPE resin, polyester resin, polypropylene resin, polyamide resin, acrylic resin and blends of one or more of the above resins with the foregoing polyolefin resin(s). Light-reflective light-shielding material may also be blended in the outer layer, because heat resistance, light-shielding, moistureproofness, printability, appearance and the like are improved.

The static friction coefficient of the outer layer is greater than the inner layer by 0.05 or more, and this static friction coefficient is 0.19 or more. In the case that the static friction coefficient does not satisfy these requirements, various troubles can occur in the film molding process, lamination process, bag making process, product packaging process and transportation of the packaged product because of the slip between the packaging films.

The thickness of the outer layer is usually 5 to 150 $\mu$m, particularly 10 to 70 $\mu$m.

The inner layer and the outer layer are formed by coextrusion. In the case of double layer coextruded film, the binding strength between them is 10 g/15 mm width or more. When the binding strength is less than 10 g/15 mm width, delamination troubles can occur in the lamination process, bag making process, heat sealing process or other processes. The delaminated film loses the essential properties as a packaging material for photographic photosensitive materials, such as light-shielding, moistureproofness and gas barrier.

A light-shielding material other than carbon black may be blended into the inner layer or the outer layer. This light-shielding material may be a light-reflective material or a light-absorptive material.

The light-reflective material includes metal powder, metal flake, metal fiber and white pigment, and aluminum powder and the aluminum paste from which low volatile components are removed is preferable. The aluminum powder is manufactured by atomization, powdering, dropping on a rotary disc or evaporation from melted aluminum. Since aluminum powder is unstable, it is stabilized by a known treatment. Production of the metal powder for blending with plastics is disclosed, for example, in Japanese Patent KOKAI No. 59-75931. The paste of aluminum powder is produced by adding mineral spirits and a small amount of a higher fatty acid such as stearic acid or oleic acid to form paste at the production of aluminum powder according to a known method, such as using a ball mill, a stamp mill or an atomizer.

An intermediate layer may be provided between the inner layer and the outer layer. This is formed of one or more kinds of thermoplastic resins. The thermoplastic resin of the intermediate layer may be selected from the polyolefin resins enumerated in the foregoing outer layer. Such a polyolefin resin is preferable in terms of the binding strength to the inner layer L-LDPE resin, film moldability, low curling and inexpensiveness.

Heat sealing properties, physical strengths, wear resistance and moistureproofness of the intermediate layer are not so strictly required, because they are satisfied by the inner layer and the outer layer. Accordingly, a conductive material may be added to the intermediate layer, though the conductive material generally lowers the above properties. In this case, the conductive material and the base resin may be selected from those in connection with the outer layer. The binding strengths of the intermediate layer to the inner layer and to the outer layer are 10 g/15 mm width or more, and the kind of resin and composition of the layer are selected so as to satisfy this requirement. In general, the resin of the intermediate layer is preferably similar to the outer layer, and various polyolefin resins are preferable as the principal component. The foregoing light-shielding material other than carbon black may be blended into the intermediate layer.

The thickness of the intermediate layer is usually 5 to 150 μm, particularly 10 to 50 μm.

Coextrusion may be carried out according to a known method such as T die extrusion or the inflation process. The thickness of the coextruded film is determined so as to secure light-shielding, moistureproofness and physical strengths, and it is usually 30 to 200 μm. In the case of a film thinner than 30 μm, it becomes difficult to secure moistureproofness, waterproofness, physical strengths, dropping strength and the like. While, in the case of a film thicker than 200 μm, troubles happen in molding such as generation of rough texture (melt fracture) an an increse in load on the motor of the extruder. The cost of the film also increases.

The packaging material of the invention may be composed of the coextruded film alone, or other flexible sheet(s) may be laminated thereon. When an other flexible sheet is laminated, the thickness of the coextruded film can be made 10% or more thinner than the case of the coextruded film alone. The flexible sheet capable of being laminated on the coextruded film includes various unstretched, uniaxially stretched or biaxially stretched thermoplastic resin films such as various polyethylene films, ethylene copolymer films, polypropylene films, polyvinyl chloride films, polyvinylidene chloride films, polyamide films, polycarbonate films, polyester films and their modified resin films. Various flexible sheets such as a metallized film including aluminum-metallized film, aluminum-metallized paper, cellulose acetate film, cellophane, polyvinyl alcohol film, various papers, metal foil such as aluminum foil, non-woven fabric, cross laminated porous fabric, a porous film, foamed polyethylene sheet, foamed polypropylene sheet, foamed polystyrene sheet and foamed polyurethane sheet are also suitable.

When the packaging material is a composite film, the inner layer of the coextruded film is located as the inner face layer in order to secure heat sealing properties and moistureproofness.

Flexible sheet layers may be laminated according to any known method, however, dry laminating extrusion laminating are particularly favorable. The adhesive suitable for extrusion laminating includes various polyolefin resins such as polyethylene resin, polypropylene resin, polybutylene resin and ethylene copolymer resins including EVA resins, EMA resin, EEA resin and L-LDPE resin, and ionomer resins ("SURLYN" DuPont, "HIMIRAN" Mitsui Polychemical Co., Ltd., etc.). The melting point of the adhnesive employed is preferably 5° C. lower than the melting point of the flexible sheet in order to laminate without adversely affecting the flexible sheet by a thermal melting adhesion.

The thickness of the adhesive layer formed by extrusion laminating using a thermoplastic resin is usually 6 to 50 μm, preferably 10 to 20 μm. However, the thickness is determined based upon cost, application speed, thickness of the layers and the like, and accordingly, the thickness is not limited to the above range.

Representative embodiments of the packaging material of the invention are illustrated in FIGS. 1 to 6.

The packaging material of FIG. 1 is the most fundamental packaging material of the invention which is a simultaneously coextruded double layer film 4a consisting of an inner layer 1a and an outer layer 2.

Figure 2:
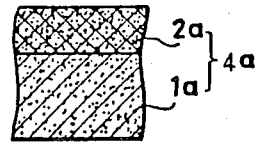

The packaging material of FIG. 2 is also a simultaneously coextruded double layer film 4a consisting of an inner layer 1a and an outer layer 2a containing a light-reflective light-shielding material.

Figure 3:
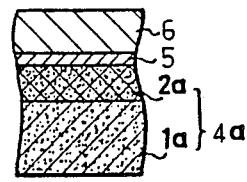

The packaging material of FIG. 3 is a composite film consisting of the simultaneously coextruded double layer film 4a of FIG. 2 and a flexible sheet layer 6 laminated thereon through an adhesive layer 5.

Figure 4:
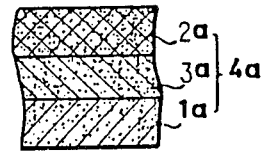

The packaging material of FIG. 4 is a simultaneously coextruded triple layer film 4a consisting of an inner layer 1a, an intermediate layer 3a and an outer layer 2a.

Figure 5:
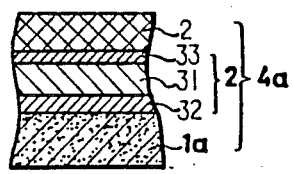

The packaging material of FIG. 5 is a simultaneously coextruded quintuple layer film 4a consisting of an inner layer 1a, an inner intermediate layer 32, a middle intermediate layer 31, an outer intermediate layer 33 and an outer layer 2.

Figure 6:
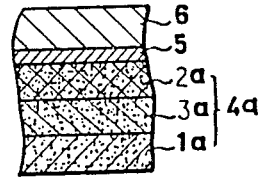

The packaging material of FIG. 6 is a composite film consisting of the simultaneously coextruded triple layer film 4a of FIG. 4 and a flexible sheet layer 6 laminated thereon through an adhesive layer 5.

Figure 7:
FIG. 7 is a partially sectional view of a comparative packaging material.

The packaging material of FIG. 7 is a comparative packaging material consisting of a light-shielding L-LDPE resin layer having the same resin composition as the inner layer 1a except that no lubricant is added.

The photographic photosensitive materials are silver halide photographic photosensitive materials, diazo photographic photosensitive materials, photosensitive resins, self-developing type photographic materials, diffusion- transfer type photographic materials and the like.

The packaging material of the invention is also suitable for other photosensitive materials discolored or denatured by light and the products particularly requiring moistureproofness and antistatic property such as integrated circuits.

The package form may be conventional, and includes a single-sheet flat bag, a double-sheet flat bag, a square bottom bag, a self-standing bag, a single-sheet gusset gag, a double-sheet gusset bag, a film sheet, inner lining for a moisture proof box and a leader paper. The sealing form may also be conventional, and includes heat sealing, impulse heat sealing, supersonic welding and high frequency sealing. The methods of using an adhesive and a pressure sensitive adhesive may also be utilized.

In the packaging material of the invention, the inner layer is excellent in light-shielding, insertion of products, antiblocking, antistatic property for frictional electrification, moistureproofness and gas barrier. It is also excellent in heat sealing properties such as heat seal strength, hot tack properties and seal ability of with contrasting material, elapsed seal strength and physical strengths. Accordingly, physical strengthes of the outer layer need not be be so high, and as a result, more than 10 wt. % of an antistatic light-shielding material such as carbon black can be blended into the outer layer to improve antistatic property including frictional electrification and light-shielding. When an intermediate layer is incorporated, this layer not only prevents delamination but also raises physical strengths of coextruded film by controlling binding strengths to the inner layer and to the outer layer. In general, the resin containing carbon black in a high content has problems in physical strengths, wear resistance, film moldability, heat sealing properties, moistureproofness, printability, appearance and the like. However, since these properties are satisfied by the inner layer and the outer layer, more than 10 wt. % of an antistatic light-shielding material such as carbon black can be blended into the intermediate layer to improve antistatic property including frictional electrification and light-shielding. Additionally, since the intermediate layer does not touch photographic photosensitive materials, the resin or the additive harmful to them can be blended therein.

EXAMPLES

The packaging material of Example 1 corresponds to the embodiment illustrated in FIG. 2. The inner layer 1a was 100 μm thick, and consisted of 96.93 wt. % of L-LDPE resin of which the α-olefin was 4-methylpentene-1 ("ULTZEX 2021L", MITSUI PETROCHEMICAL INDUSTRIES CO., LTD. ), 3 wt. % of oil furnace carbon black ("#44B" MITSUBISHI CHEMICAL INDUSTRIES LTD.) and 0.07 wt. % of oleic acid amide lubricant ("ARMOSLIP-CP", LION AKZO CO., LTD.). The outer layer 2a was 50 μm thick, and consisted of 60 wt. % of conductive resin containing carbon black ("NUC-6078", NIPPON UNICAR CO., LTD.), 35 wt. % of HDPE resin ("HIZEX 3300F" MITSUI PETROCHEMICAL INDUSTRIES CO., LTD.) and 10 wt. % of L-LDPE resin ("ULTZEX 3021L", MITSUI PETROCHEMICAL INDUSTRIES CO., LTD.).

The packaging material of Example 2 corresponds to the embodiment of FIG. 2. The inner layer 1a was 100 μm thick, and had the same resin composition as Example 1. The outer layer 2a was 50 μm thick, and consisted of 70 wt. % of conductive resin containing carbon black ("NUC-6078") and 30 wt. % of L-LDPE resin ("ULTZEX 3021L").

The packaging material of Example 3 corresponds to the embodiment of FIG. 4. The inner layer 1a was the same as the inner layer 1a of Example 1. The intermediate layer 3a was 20 μm thick, and consisted of 80 wt. % of conductive resin ("LIOCONDUCT PE COMP 245", TOYO INK MFD. CO., LTD.) and 20 wt. % of L-LDPE resin ("ULTZEX 2021L"). The outer layer 2a was 60 μm thick, and consisted of 60 wt. % of L-LDPE resin ("ULTZEX 2021L"), 38 wt. % of HDPE resin ("HIZEX 3300F") and 2 wt. % of aluminum paste (TOYO ALUMINUM CO., LTD.)

The packaging material of Example 4 corresponds to the embodiment of FIG. 4. The inner layer was the same as the inner layer of Example 1 except that its thickness was 80 μm. The intermediate layer 3a was 20 μm thick, and consisted of 70 wt. % of conductive resin ("DAIELEC PE 291", DAINIPPON INK AND CHEMICALS, INC.) and 30 wt. % of EEA resin ("NUC-6170", NIPPON UNICAR CO., LTD.). The outer layer 3 was 50 μm thick, and consisted of 70 wt. % of L-LDPE resin ("ULTZEX 2021L") and 30 wt. % of HDPE resin ("HIZEX 3300F").

Comparative packaging material 1 corresponds to FIG. 7. It was 150 μm thick, and consisted of 80 wt. % of L-LDPE resin ("ULTZEX 2021L"), 17 wt. % of L-LDPE resin ("NUC POLYETHYLENE LL-0171", NIPPON UNICAR CO., LTD.) and 3 wt. % of oil furance carbon black ("#44B").

Figure 8:
FIGS. 8 and 9 are partially sectional views of conventional packaging material.

Conventional packaging material 1 corresponds to FIG. 8. It was 150 μm thick, and consisted of 97 wt. % of LDPE resin ("DFD-011", NIPPON UNICAR CO., LTD.) and 3 wt. % of oil furnace carbon black ("#44B").

Figure 9:
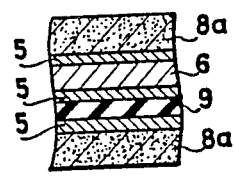

Conventional packaging material 2 corresponds to FIG. 9. It was 195 μm thick, and consisted of 50 μm thick of the light-shielding LDPE resin layer 8a having the same resin composition as the conventional packaging material 1, 7 μm thick of an aluminum foil layer 9 laminated thereon through 15 μm thick of a LDPE extrusion adhesive layer 5, 35 g/cm² of a twisting paper as flexible sheet layer 6 laminated thereon through 15 μm thick of a LDPE adhesive layer 5, and 50 μm thick of the light-shielding LDPE resin layer 8a having the same resin composition as the conventional packaging material 1 laminated thereon through 15 μm thick of a LDPE extrusion adhesive layer 5. The LDPE resin used as the adhesive layers 5 were all "MIRASON 14" (MITSUI POLYCHEMICALS CO., LTD.)

The properties of the above packaging materials are tabulated in Table 1.

TABLE 1

| Properties | Unit | Invention 1 | Invention 2 | Invention 3 | Invention 4 | Comparative 1 | Conventional 1 | Conventional 2 |
|---|---|---|---|---|---|---|---|---|
| Total Thickness | μm | 150 | 150 | 150 | 150 | 150 | 150 | 195 |
| Tear Strength (MD) | g | 1600< | 1600< | 1600< | 1600< | 1600< | 306 | 294 |
| Tear Strength (CD) | g | 1600< | 1600< | 1600< | 1600< | 1600< | 1213 | 610 |
| Heat Seal Strength 170° C. (Immediately After) | kg/15 mm width | 2.5 | 2.4 | 2.8 | 2.6 | 2.3 | 2.1 | 1.5 |
| Heat Seal Strength 190° C. (Immediately After) | " | 2.7 | 2.6 | 3.1 | 2.9 | 2.6 | 2.2 | 1.7 |
| Elapsed Heat Seal | | | | | | | | |

TABLE 1-continued

| Properties | Unit | Invention 1 | Invention 2 | Invention 3 | Invention 4 | Comparative 1 | Conventional 1 | Conventional 2 |
|---|---|---|---|---|---|---|---|---|
| Strength 170° C. (After 1 Month) Elapsed Heat Seal | " | 2.4–2.6 | 2.3–2.5 | 2.6–2.9 | 2.5–2.7 | 2.2–2.4 | 0.9–2.2 | 0.7–1.5 |
| Strength 190° C. (After 1 Month) | " | 2.6–2.7 | 2.5–2.7 | 2.9–3.2 | 2.8–3.1 | 2.3–2.6 | 1.1–2.3 | 0.9–1.8 |
| Insertion of Products | — | A | A | A | A | E | E | C |
| Hot Tack Properties | — | A | A | A | A | B | D | D |
| Seal Ability with contrasting material | — | A | A | A | A | B | D | D |
| Light-Shielding | — | A | A | A | A | A | C* | C* |
| Frictional Electrification (Inner Layer) | V | −6 | 0 | 0 | 0 | −70 | −45 | 0 |
| Statical Friction Coefficient (Inner Layer) | — | 0.13 | 0.14 | 0.14 | 0.15 | 1.0 | 0.38 | 0.38 |
| Statical Friction Coefficient (Outer Layer) | — | 0.41 | 0.53 | 0.33 | 0.35 | 0.73 | 0.36 | 0.37 |
| Bag-Making Aptitude | — | A | A | A | A | D | D | D |
| Facility in Treatment | — | A | B | A | B | D | C | C |
| Appearance | — | B | B | A | B | D | C | C |

*Heat sealed position was weak, and pinholes were liable to be generated.

Evaluations in Table 1 were carried out as follows:
A very excellent
B excellent
C practial
D having a problem
E impractical Testing methods were as follows:
Thickness; JIS P-8118
Tear Strength; JIS P-8116

Heat Seal Strength: Two sheets of exemplified film having 15 mm in width were superposed, and sealed by heat sealing at a prescribed temperature at 1 kg/cm² of sealing pressure for one second. After cooled entirely, the weight necessary to release the seal at a pulling angle of 180 degrees was determined.

Hot Tack Properties and Seal Ability with contrasting material: Two sheets of each exemplified film having 15 mm in width were sealed by heat sealing, and just after, the open ends were pulled by the weight of 45 g at the releasing angle of 22.5 degree. This character was estimated by the released length (cm).

Light-Shielding Character: A photographic film of ASA 100 was put into the bag made by each exemplified film, and then the bag was completely sealed. This bag was exposed to the light of 80,000 luxes for one hour, and the light-shielding character was estimated by the fogging degree of the photographic film.

Frictional Electrification: An endless belt of each exemplified film having 35 mm in width and 1350 mm in length was prepared, this belt was run between two SUS rollers loaded with 500 g at a speed of 12 m/min. The frictional electrification was measured by a voltmeter.

Static Friction coefficient: A part of each exemplified film was cut off, and stuck on the underside of a 75 mm length×35 mm width of a block weighing 200 g. Another part of the sample was stuck on an inclined face, and the above block was placed on the face. The inclined angle was increased, and the angle (θ) where the block began to slip was read. The coefficient is represented by tangent.

Bag-Making Aptitude: Photographic photosensitive materials were packaged in a three-sided fin seal bag using each exemplified film by an automatic bag-making machine. This property was judged by generation of pinholes, heat sealing aptitude and insertion of the photographic photosensitive materials.

Facility in Treatment: Judged by whole treatment through film molding process, laminating process, bag-making procses and transportation of packaged products.

I claim:

1. A packaging material for photographic photosensitive materials which comprises a multiple layer light-shielding film which is simultaneously coextruded in the absence of a support, said film comprising an inner layer which is a heat-sealing layer containing 30 to 99.49 wt. % of linear low density polyethylene resin, 0.5 to 10 wt. % of carbon black and 0.01 to 1 wt. % of a lubricant, and having a static friction coefficient of 0.12 to 0.37 and an outer layer formed of a thermoplastic resin having a static friction coefficient of 0.19 or more and which is greater than said inner layer by 0.05 or more, and having a binding strength of 10 g/15 mm width or more between the layers of said coextruded multiple layer film.

2. The packaging material of claim 1 wherein an intermediate layer formed of a thermoplastic resin is provided between said inner layer and said outer layer.

3. The packaging material of claim 1 or claim 2 wherein the carbon number of α-olefin which is a comonomer of said linear low density polyethylene is 6 or more.

4. The packaging material of claim 1 or claim 2 wherein said thermoplastic resin of the outer layer contains more than 30 wt. % of polyolefin.

5. The packaging material of claim 2 wherein said thermoplastic resin of the intermediate layer contains more than 30 wt. % of polyolefin.

6. The packaging material of claim 2 wherein said intermediate layer contains a conductive material.

* * * * *